(12) United States Patent
Okudaira

(10) Patent No.: US 12,391,818 B2
(45) Date of Patent: Aug. 19, 2025

(54) TIRE

(71) Applicant: SUMITOMO RUBBER INDUSTRIES, LTD., Hyogo (JP)

(72) Inventor: Saki Okudaira, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 646 days.

(21) Appl. No.: 17/781,432

(22) PCT Filed: Sep. 10, 2020

(86) PCT No.: PCT/JP2020/034208
§ 371 (c)(1),
(2) Date: Jun. 1, 2022

(87) PCT Pub. No.: WO2021/111693
PCT Pub. Date: Jun. 10, 2021

(65) Prior Publication Data
US 2023/0024410 A1 Jan. 26, 2023

(30) Foreign Application Priority Data
Dec. 5, 2019 (JP) .................. 2019-220669

(51) Int. Cl.
*C08K 3/04* (2006.01)
*B60C 1/00* (2006.01)
*B60C 11/00* (2006.01)
*C08K 3/36* (2006.01)

(52) U.S. Cl.
CPC ............. *C08K 3/04* (2013.01); *B60C 1/0016* (2013.01); *B60C 11/0008* (2013.01); *C08K 3/36* (2013.01); *B60C 2011/0016* (2013.01); *C08K 2201/006* (2013.01)

(58) Field of Classification Search
CPC ............... B60C 1/0016; B60C 2011/0025
See application file for complete search history.

(56) References Cited

U.S. PATENT DOCUMENTS

| 9,982,116 | B2 | 5/2018 | Kimura et al. | |
| 2004/0116587 | A1* | 6/2004 | Victor Thielen | B60C 1/0016 |
| | | | | 524/502 |
| 2005/0056356 | A1* | 3/2005 | Lechtenbohmer | B60C 11/0311 |
| | | | | 152/209.1 |
| 2006/0094831 | A1* | 5/2006 | Choi | C08K 5/40 |
| | | | | 525/337 |
| 2008/0027176 | A1 | 1/2008 | Nishioka et al. | |
| 2013/0345336 | A1 | 12/2013 | Lopitaux | |
| 2017/0313861 | A1* | 11/2017 | Winston | C08L 9/06 |

FOREIGN PATENT DOCUMENTS

| JP | 58-25338 | | 2/1983 |
| JP | H11-29656 | * | 2/1999 |
| JP | 2002-47382 | | 2/2002 |
| JP | 2002-097303 | * | 4/2002 |
| JP | 2002-97303 | | 4/2002 |
| JP | 2003-176379 | | 6/2003 |
| JP | 2005-036165 | A | 2/2005 |
| JP | 2005-154473 | * | 6/2005 |
| JP | 2005-255796 | A | 9/2005 |
| JP | 2008-50571 | | 3/2008 |
| JP | 2012-36268 | | 2/2012 |
| JP | 2014-506277 | | 3/2014 |
| JP | 2017036371 | * | 2/2017 |
| JP | 2019-189672 | A | 10/2019 |
| JP | 2019-189673 | | 10/2019 |

OTHER PUBLICATIONS

Translation of JP 2002-097303 (Year: 2002).*
Translation of JP 2005-154473 (Year: 2005).*
Translation of JP H11-29656 (Year: 1999).*
Translation of Table 3 of JP H11-29656 (Year: 1999).*
Translation of JP2017036371 (Year: 2017).*
International Search Report, International Patent Application No. PCT/JP2020/034208, issued Dec. 8, 2020, (with English translation).

* cited by examiner

*Primary Examiner* — Robert C Boyle
(74) *Attorney, Agent, or Firm* — GREENBLUM & BERNSTEIN, P.L.C.

(57) ABSTRACT

The present disclosure provides a tire which makes it possible to reduce the increase in hardness and the decrease in wet grip performance from before to after heat aging. The present disclosure relates to a tire including a tread, the tread including an elastomer composition containing a styrene elastomer and urethane particles, the tread satisfying the following relationship (1): (M100a−M100f)/M100f× 100≤38 wherein M100f represents the stress at 100% elongation (23° C.) before heat aging, and M100a represents the stress at 100% elongation (23° C.) after heat aging.

17 Claims, No Drawings

TIRE

TECHNICAL FIELD

The present disclosure relates to a tire.

BACKGROUND ART

In today's car society, maintenance opportunities are decreasing due to the expansion of autonomous driving, car sharing, and other services. Thus, it is desirable for tires to maintain safety over a long period of time (i.e., to have a longer life). For a longer life, it is necessary to sustain the rubber performance when new, and thus the rubber properties after heat aging are very important.

However, in general, rubber compositions of tires lose flexibility after long term use as the moduli (e.g., M100) after heat aging is greatly increased. Therefore, disadvantageously, the hardness of aged tires is increased so that tire physical properties such as wet grip performance are deteriorated.

Patent Literature 1 discloses a tire including a tread containing a natural rubber, a polybutadiene rubber, and urethane particles, but this disclosure is intended to improve ice performance, not to improve tire physical properties after aging.

CITATION LIST

Patent Literature

Patent Literature 1: JP 2012-36268 A

SUMMARY OF DISCLOSURE

Technical Problem

The present disclosure aims to solve the above problem and provide a tire which makes it possible to reduce the increase in hardness and the decrease in wet grip performance from before to after heat aging.

Solution to Problem

The present disclosure relates to a tire, including a tread, the tread including an elastomer composition containing a styrene elastomer and urethane particles, the tread satisfying the following relationship (1):

$$(M100a - M100f)/M100f \times 100 \leq 38 \quad (1)$$

wherein M100f represents stress at 100% elongation (23° C.) before heat aging, and M100a represents stress at 100% elongation (23° C.) after heat aging.

Preferably, the urethane particles have an average particle size of 500 μm or less.

Preferably, the styrene elastomer is a styrene-butadiene rubber.

Preferably, the elastomer composition as a whole has a ratio of a styrene content to an urethane particle content (total styrene content/total urethane particle content) of 0.5 to 5.0.

Preferably, the elastomer composition as a whole has a ratio of a styrene content to a silica content (total styrene content/total silica content) of 0.05 to 3.00.

Preferably, the elastomer composition as a whole has a ratio of a styrene content to a solid resin content (total styrene content/total solid resin content) of 0.5 to 3.5.

Preferably, the elastomer composition contains at least one solid resin selected from the group consisting of styrene resins and terpene resins.

Preferably, the elastomer composition has a styrene-butadiene rubber content of 50 to 95% by mass and a polybutadiene rubber content of 5 to 50% by mass, each based on 100% by mass of elastomer components in the elastomer composition.

Preferably, the styrene-butadiene rubber has a styrene content of 5 to 50% by mass, a vinyl content of 10 to 80 mol %, and a weight average molecular weight of 200,000 to 1,500,000.

Preferably, the styrene-butadiene rubber is a modified styrene-butadiene rubber.

Preferably, the elastomer composition has an urethane particle content of 1 to 50 parts by mass per 100 parts by mass of elastomer components in the elastomer composition.

Preferably, the elastomer composition contains at least one selected from the group consisting of silica and carbon black.

Preferably, the silica has a nitrogen adsorption specific surface area of 80 to 250 $m^2/g$, and the carbon black has a nitrogen adsorption specific surface area of 40 to 200 $m^2/g$.

Preferably, the elastomer composition contains at least one selected from the group consisting of liquid plasticizers and solid resins.

Preferably, the tire satisfies the following relationship (1f):

$$0.50 \text{ MPa} \leq M100f \leq 7.00 \text{ MPa} \quad (1f)$$

wherein M100f represents stress at 100% elongation (23° C.) before heat aging.

Preferably, the tire is a summer passenger tire.

Advantageous Effects of Disclosure

The tire according to the present disclosure includes a tread which includes an elastomer composition containing a styrene elastomer and urethane particles and which satisfies relationship (1). Such a tire makes it possible to reduce the increase in hardness and the decrease in wet grip performance from before to after heat aging.

DESCRIPTION OF EMBODIMENTS

The tire of the present disclosure includes a tread which includes an elastomer composition containing a styrene elastomer and urethane particles and which satisfies relationship (1). Thus, it is possible to reduce the increase in hardness and the decrease in wet grip performance from before to after heat aging.

The mechanism for this advantageous effect is not exactly clear but is believed to be as follows.

When urethane particles are added to an elastomer composition containing a styrene elastomer, and further the change (increase) in M100 (stress at 100% elongation (100% modulus)) before and after aging is adjusted to a predetermined small value or lower, it is believed that the elastomer composition can be prevented from deteriorating in flexibility because the urethane particles generally have higher heat resistance than the styrene elastomer, and also because there is a slight change in hardness before and after aging and thus the increase in hardness due to aging can be reduced. Accordingly, it is believed that the elastomer composition shows less increase in hardness due to heat aging, and the decrease in wet grip performance over time can be reduced.

Thus, the present disclosure solves the problem (purpose) of reducing the increase in hardness and the decrease in wet grip performance from before to after heat aging by formulating an elastomer composition containing a styrene elastomer and urethane particles to satisfy relationship (1). In other words, the parameter of relationship (1) does not define the problem (purpose), and the problem herein is to reduce the increase in hardness and the decrease in wet grip performance from before to after heat aging. In order to provide a solution to this problem, the composition has been formulated to satisfy the parameter.

The tread (the vulcanized elastomer composition forming the tread) in the tire satisfies the following relationship (1):

$$(M100a-M100f)/M100f \times 100 \leq 38 \tag{1}$$

wherein M100f represents the stress at 100% elongation (23° C.) before heat aging, and M100a represents the stress at 100% elongation (23° C.) after heat aging.

From the standpoint of reducing the increase in hardness and the decrease in wet grip performance due to aging, the value of "(M100a−M100f)/M100f×100 (=ΔM, the rate (%) of change in stress at 100% elongation at 23° C. before and after heat aging)" is preferably 36% or lower, more preferably 34% or lower, still more preferably 32% or lower. The rate of change is also desirably as low as possible. Rates of change of 31% or lower, 28% or lower, 26% or lower, 25% or lower, 21% or lower, 17% or lower, 14% or lower, 11% or lower, and 7% or lower are increasingly desirable. Moreover, the lower limit of the rate of change is not limited. A lower rate of change is more preferred. From a practical standpoint, it may be 3% or higher or 5% or higher.

From the standpoint of tire physical properties such as wet grip performance, the tread (the vulcanized elastomer composition forming the tread) preferably satisfies the following relationship (1f):

$$0.50 \text{ MPa} \leq M100f \leq 7.00 \text{ MPa} \tag{1f}$$

wherein M100f represents the stress at 100% elongation (23° C.) before heat aging.

The lower limit of M100f (stress at 100% elongation at 23° C. before heat aging) is more preferably 0.80 MPa or higher, still more preferably 1.00 MPa or higher, particularly preferably 1.40 MPa or higher, most preferably 1.50 MPa or higher. The upper limit is more preferably 5.00 MPa or lower, still more preferably 4.00 MPa or lower, particularly preferably 2.90 MPa or lower, most preferably 2.80 MPa or lower.

The heat aging is conducted in accordance with JIS K 6257:2010 "Rubber, vulcanized or thermoplastic—Determination of heat ageing properties" under heat aging conditions (at 80° C. for one week (168 hours)). M100 (stress at 100% elongation at 23° C.) is the stress at 100% elongation measured in a tensile test at 23° C. and 500 mm/min in accordance with JIS K 6251:2010 "Rubber, vulcanized or thermoplastics—Determination of tensile stress-strain properties".

The ΔM (the rate (%) of change in stress at 100% elongation at 23° C. before and after heat aging) may be reduced by, for example, one or an appropriate combination of the following methods: a method of using a styrene elastomer having good heat resistance; a method of selecting urethane particles of appropriate urethane type; a method of adding urethane particles having a hardness equal to the hardness of the styrene elastomer used; a method of controlling the amount of urethane particles added; a method of controlling the average particle size of urethane particles; etc. In this way, the ΔM can be adjusted to a small value.

The M100f may be appropriately controlled by changing the types and amounts of the styrene elastomer, filler, and/or urethane particles. For example, the M100f may be adjusted within the range of relationship (1f) by one or an appropriate combination of the following methods: a method of using a styrene-butadiene rubber as the styrene elastomer; a method of controlling the molecular weight of the styrene elastomer; a method of controlling the filler content; a method of using silica or carbon black as a filler; a method of using highly flexible urethane particles; a method of changing the particle size of filler; a method of changing the particle size of urethane particles; etc.

(Elastomer Component)

The tread (the vulcanized elastomer composition forming the tread) contains a styrene elastomer.

The tread (the vulcanized elastomer composition forming the tread) preferably has a styrene elastomer content of 50% by mass or more, more preferably 65% by mass or more, still more preferably 75% by mass or more, particularly preferably 80% by mass or more, most preferably 85% by mass or more, based on 100% by mass of the elastomer components. The upper limit of the styrene elastomer content is not limited but is preferably 95% by mass or less, more preferably 90% by mass or less. When the styrene elastomer content is within the range indicated above, the increase in hardness and the decrease in wet grip performance due to aging tend to be reduced.

The styrene elastomer may be any elastomer that contains a structural unit derived from a compound having a styrene backbone. Examples include copolymers (block copolymers or random copolymers) of styrene and olefins other than styrene. Examples of the olefins other than styrene include butadiene, isoprene, ethylene, propylene, and butylene. Butadiene is preferred among these.

The styrene elastomer may be an unsaturated styrene elastomer or a hydrogenated styrene elastomer. Examples of the unsaturated styrene elastomer include styrene-butadiene copolymers such as styrene-butadiene random copolymers and polystyrene-polybutadiene-polystyrene block copolymers (SBS); and styrene-isoprene copolymers such as styrene-isoprene random copolymers and polystyrene-polyisoprene-polystyrene block copolymers (SIS).

The hydrogenated styrene elastomer may be, for example, a hydrogenated product of the unsaturated styrene elastomer (in which the unsaturated bonds of the olefin component are at least partially hydrogenated). Examples of the hydrogenated styrene elastomer include styrene-ethylene-butylene copolymers such as styrene-ethylene-butylene random copolymers and polystyrene-poly(ethylene-butylene)-polystyrene block copolymers (SEBS); styrene-ethylene-propylene copolymers such as styrene-ethylene-propylene random copolymers and polystyrene-poly(ethylene-propylene) block copolymers (SEP); styrene-isobutylene copolymers such as styrene-isobutylene random copolymers and polystyrene-polyisobutylene block copolymers (SIB); and styrene-ethylene-isoprene copolymers such as styrene-ethylene-isoprene random copolymers and polystyrene-poly(ethylene-isoprene)-polystyrene block copolymers (SIPS).

From the standpoint of reducing the increase in hardness and the decrease in wet grip performance due to aging, styrene-butadiene copolymers (styrene-butadiene rubbers (SBR)) are preferred among the listed styrene elastomers.

The tread (the vulcanized elastomer composition forming the tread) preferably has a SBR content of 50% by mass or more, more preferably 65% by mass or more, still more preferably 75% by mass or more, particularly preferably 80% by mass or more, most preferably 85% by mass or more, based on 100% by mass of the elastomer components. The upper limit of the SBR content is not limited but is preferably 95% by mass or less, more preferably 90% by mass or less. When the SBR content is within the range indicated above, the increase in hardness and the decrease in wet grip performance due to aging tend to be reduced.

The lower limit of the styrene content of the SBR is preferably 5% by mass or higher, more preferably 10% by mass or higher, still more preferably 20% by mass or higher, particularly preferably 21% by mass or higher, most preferably 25% by mass or higher. The upper limit of the styrene content is preferably 50% by mass or lower, more preferably 40% by mass or lower, still more preferably 30% by mass or lower, particularly preferably 28% by mass or lower.

The lower limit of the vinyl content of the SBR is preferably 10 mol % or higher, more preferably 20 mol % or higher, still more preferably 30 mol % or higher, particularly preferably 40 mol % or higher, most preferably 60 mol % or higher. The upper limit of the vinyl content is preferably 80 mol % or lower, more preferably 70 mol % or lower, still more preferably 66 mol % or lower.

The weight average molecular weight (Mw) of the SBR is preferably 200,000 or more, more preferably 240,000 or more, still more preferably 500,000 or more, particularly preferably 600,000 or more, most preferably 700,000 or more. Moreover, the upper limit of the Mw is not limited but is preferably 1,500,000 or less, more preferably 1,200,000 or less, still more preferably 1,000,000 or less, particularly preferably 900,000 or less.

Herein, the styrene content of the SBR can be determined by $^1$H-NMR analysis. The vinyl content refers to the vinyl content of the butadiene portion (the quantity of vinyl units in the butadiene structure) as determined by $^1$H-NMR analysis. The Mw may be determined by gel permeation chromatography (GPC) (GPC-8000 series available from Tosoh Corporation, detector: differential refractometer, column: TSKGEL SUPERMALTPORE HZ-M available from Tosoh Corporation) calibrated with polystyrene standards.

The SBR may be unmodified or modified SBR. These may be used alone or in combinations of two or more.

The modified SBR may be SBR having a functional group interactive with a filler such as silica. Examples include chain end-modified SBR obtained by modifying at least one chain end of SBR with a compound (modifier) having the functional group (i.e., chain end-modified SBR terminated with the functional group); backbone-modified SBR having the functional group in the backbone; backbone- and chain end-modified SBR having the functional group in both the backbone and chain end (e.g., backbone- and chain end-modified SBR in which the backbone has the functional group and at least one chain end is modified with the modifier); and chain end-modified SBR into which a hydroxy or epoxy group has been introduced by modification (coupling) with a polyfunctional compound having two or more epoxy groups in the molecule. These may be used alone or in combinations of two or more.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. These functional groups may be substituted. Preferred among these are amino groups (preferably amino groups whose hydrogen atom is replaced with a C1-C6 alkyl group), alkoxy groups (preferably C1-C6 alkoxy groups), and alkoxysilyl groups (preferably C1-C6 alkoxysilyl groups).

The modified SBR having the functional group may suitably be SBR (S-modified SBR) modified with a compound (a modifier) represented by the following formula:

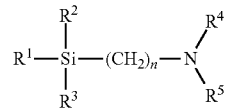

wherein $R^1$, $R^2$, and $R^3$ are the same or different and each represent an alkyl group, an alkoxy group, a silyloxy group, an acetal group, a carboxyl (—COOH) group, or a mercapto (—SH) group, or a derivative of the foregoing; $R^4$ and $R^5$ are the same or different and each represent a hydrogen atom or an alkyl group, and $R^4$ and $R^5$ may be joined together to form a ring structure with the nitrogen atom; and n represents an integer.

Suitable examples of the S-modified SBR include solution-polymerized styrene-butadiene rubbers (S-SBR) having a polymerizing end (active terminal) modified with the compound of the above formula (S-modified S-SBR (e.g., modified SBR described in JP 2010-111753 A)).

$R^1$, $R^2$, and $R^3$ may each suitably be an alkoxy group, preferably a C1-C8 alkoxy group, more preferably a C1-C4 alkoxy group. $R^4$ and $R^5$ may each suitably be an alkyl group, preferably a C1-C3 alkyl group. The integer n is preferably 1 to 5, more preferably 2 to 4, still more preferably 3. Moreover, when $R^4$ and $R^5$ are joined together to form a ring structure with the nitrogen atom, the ring structure is preferably a 4- to 8-membered ring. The term "alkoxy group" encompasses cycloalkoxy groups (e.g., a cyclohexyloxy group) and aryloxy groups (e.g., a phenoxy group, a benzyloxy group).

Specific examples of the compound of the above formula (the above modifier) include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. Preferred among these are 3-dimethylaminopropyltrimethoxysilane, 3-dimethylaminopropyltriethoxysilane, and 3-diethylaminopropyltrimethoxysilane. These may be used alone or in combinations of two or more.

Other suitable examples of the modified SBR include SBR modified with the following compounds (modifiers). Examples of the modifiers include: polyglycidyl ethers of polyhydric alcohols such as ethylene glycol diglycidyl ether, glycerol triglycidyl ether, trimethylolethane triglycidyl ether, and trimethylolpropane triglycidyl ether; polyglycidyl ethers of aromatic compounds having two or more phenol groups such as diglycidylated bisphenol A; polyepoxy compounds such as 1,4-diglycidylbenzene, 1,3,5-triglycidylbenzene, and polyepoxidized liquid polybutadiene; epoxy group-containing tertiary amines such as 4,4'-diglycidyldiphenylmethylamine and 4,4'-diglycidyl-dibenzylmethylamine; diglycidylamino compounds such as diglycidylaniline, N,N'-diglycidyl-4-glycidyloxyaniline, diglycidylorthotoluidine, tetraglycidyl meta-xylenediamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis(1-methylpropyl)carbamyl chloride, 4-morpholinecarbonyl chloride, 1-pyrrolidinecarbonyl chloride, N,N-dimethylcarbamic acid chloride, and N,N-diethylcarbamic acid chloride; epoxy group-containing silane compounds such as 1,3-bis (glycidyloxypropyl)-tetramethyldisiloxane and (3-glycidyloxypropyl)-pentamethyldisiloxane;

sulfide group-containing silane compounds such as (trimethylsilyl) [3-(trimethoxysilyl)propyl]sulfide, (trimethylsilyl) [3-(triethoxysilyl)propyl]sulfide, (trimethylsilyl) [3-(tripropoxysilyl)propyl]sulfide, (trimethylsilyl) [3-(tributoxysilyl)propyl]sulfide, (trimethylsilyl) [3-(methyldimethoxysilyl)propyl]sulfide, (trimethylsilyl) [3-(methyldiethoxysilyl)propyl]sulfide, (trimethylsilyl) [3-(methyldipropoxysilyl)propyl]sulfide, and (trimethylsilyl) [3-(methyldibutoxysilyl)propyl]sulfide;

N-substituted aziridine compounds such as ethyleneimine and propyleneimine; alkoxysilanes such as methyltriethoxysilane; (thio)benzophenone compounds containing amino and/or substituted amino groups such as 4-N,N-dimethylaminobenzophenone, 4-N,N-di-t-butylaminobenzophenone, 4-N,N-diphenylaminobenzophenone, 4,4'-bis(dimethylamino)benzophenone, 4,4'-bis(diethylamino)benzophenone, 4,4'-bis(diphenylamino)benzophenone, and N,N,N',N'-bis (tetraethylamino)benzophenone; benzaldehyde compounds containing amino and/or substituted amino groups such as 4-N,N-dimethylaminobenzaldehyde, 4-N,N-diphenylaminobenzaldehyde, and 4-N,N-divinylaminobenzaldehyde; N-substituted pyrrolidones such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone; N-substituted piperidones such as N-methyl-2-piperidone, N-vinyl-2-piperidone, and N-phenyl-2-piperidone; N-substituted lactams such as N-methyl-s-caprolactam, N-phenyl-c-caprolactam, N-methyl-o-laurilolactam, N-vinyl-o)-laurilolactam, N-methyl-p-propiolactam, and N-phenyl-p-propiolactam;

N,N-bis(2,3-epoxypropoxy)aniline, 4,4-methylene-bis(N, N-glycidylaniline), tris(2,3-epoxypropyl)-1,3,5-triazine-2,4, 6-triones, N,N-diethylacetamide, N-methylmaleimide, N,N-diethylurea, 1,3-dimethylethylene urea, 1,3-divinylethylene urea, 1,3-diethyl-2-imidazolidinone, 1-methyl-3-ethyl-2-imidazolidinone, 4-N,N-dimethylaminoacetophenone, 4-N, N-diethylaminoacetophenone, 1,3-bis(diphenylamino)-2-propanone, and 1,7-bis(methylethylamino)-4-heptanone.

Modification of SBR with any of the modifiers may be performed by conventionally known techniques, such as by contacting a styrene-butadiene rubber with the compound. In a specific exemplary method, after the preparation of SBR by solution polymerization, a predetermined amount of the compound is added to the rubber solution to react the polymerizing end (active terminal) of the SBR with the modifier.

SBR products manufactured or sold by Sumitomo Chemical Co., Ltd., JSR Corporation, Asahi Kasei Corporation, Zeon Corporation, etc. may be used as the SBR.

Examples of usable elastomer components other than SBR include rubber components such as diene rubbers, including isoprene-based rubbers (e.g., natural rubbers (NR) and polyisoprene rubbers (IR), and refined products of these rubbers), polybutadiene rubbers (BR), acrylonitrile-butadiene rubbers (NBR), chloroprene rubbers (CR), butyl rubbers (IIR), and styrene-isoprene-butadiene copolymer rubbers (SIBR). These may be used alone or in combinations of two or more. BR and isoprene-based rubbers are preferred among these, with BR being more preferred.

The tread (the vulcanized elastomer composition forming the tread) preferably has a BR content of 5% by mass or more, more preferably 10% by mass or more, still more preferably 12% by mass or more, based on 100% by mass of the elastomer components. The upper limit of the BR content is preferably 50% by mass or less, more preferably 40% by mass or less, still more preferably 30% by mass or less, particularly preferably 20% by mass or less, most preferably 15% by mass or less. When the BR content is within the range indicated above, the increase in hardness and the decrease in wet grip performance due to aging tend to be reduced.

Examples of the BR include high-cis BR, low-cis BR, and BR containing syndiotactic polybutadiene crystals. These may be used alone or in combinations of two or more.

The cis content of the BR is preferably 90% by mass or higher, more preferably 95% by mass or higher, still more preferably 98% by mass or higher. The upper limit is not limited. When the cis content is within the range indicated above, the advantageous effect tends to be well achieved.

The cis content of the BR may be determined by infrared absorption spectrometry.

The BR may be unmodified or modified BR. Examples of the modified BR include those modified with the above-mentioned modifiers.

The BR may be commercially available from Ube Industries, Ltd., JSR Corporation, Asahi Kasei Corporation, Zeon Corporation, etc.

(Urethane particles)

The tread (the vulcanized elastomer composition forming the tread) contains urethane particles (urethane beads). The addition of urethane particles can reduce the increase in hardness due to aging and can provide good tire physical properties such as wet grip performance for a long time.

The urethane particle content per 100 parts by mass of the elastomer components is preferably 1 part by mass or more, more preferably 2 parts by mass or more, still more preferably 3 parts by mass or more, particularly preferably 5 parts by mass or more, most preferably 10 parts by mass or more. The upper limit of the urethane particle content is preferably 50 parts by mass or less, more preferably 30 parts by mass or less, still more preferably 20 parts by mass or less, particularly preferably 15 parts by mass or less. When the urethane particle content is within the range indicated above, the increase in hardness and the decrease in wet grip performance due to aging tend to be reduced. In the case of urethane particles containing materials other than urethane resins (e.g., the urethane particles encapsulating a liquid plasticizer described later), the urethane particle content is the amount of the whole urethane particles containing the materials.

From the standpoint of reducing the increase in hardness and the decrease in wet grip performance due to aging, the average particle size of the urethane particles is suitably 500 µm or less. The upper limit of the average particle size is preferably 45 µm or less, more preferably 40 µm or less, still more preferably 35 µm or less, particularly preferably 20 µm or less, most preferably 15 µm or less. The lower limit is preferably 1 µm or more, more preferably 3 µm or more, still more preferably 5 µm or more, particularly preferably 6 µm or more.

The average particle size refers to the particle size corresponding to the 50th percentile of the cumulative particle size distribution.

The structure of the urethane particles is not limited, and examples include a solid structure (fully filled urethane resin beads), a hollow structure (hollow urethane resin beads having a cavity inside), and a capsule structure encapsulating a core material (urethane resin beads encapsulating a material such as a softener). The urethane particles may be surface modified particles (e.g., urethane particles whose surface is modified with a modifier to improve affinity for elastomers). The urethane particles may also be colored with a pigment or other colorant.

Urethane particles having a capsule structure encapsulating a core material (urethane particles encapsulating a material) include an urethane resin shell and a core material encapsulated (enclosed) as a core in the shell. When such urethane particles having a capsule structure encapsulating a core material are used, the capsules may be broken over time to release the core material, thereby improving the physical properties of the elastomer composition to reduce a change in moduli such as M100.

The encapsulated core material used is desirably a performance improver having an effect of improving properties such as wet grip performance after heat aging. From the standpoint of reducing the increase in hardness and the decrease in wet grip performance due to aging, the performance improver is preferably a liquid plasticizer. The amount of the performance improver relative to the shell (urethane resin) may be appropriately selected in view of the performance-improving effect and other aspects.

Any liquid plasticizer that is liquid at 25° C. may be used. Examples include oils, liquid diene polymers, and liquid resins. These may be used alone or in combinations of two or more.

Examples of the oils include conventional oils, including process oils such as paraffinic process oils, aromatic process oils, and naphthenic process oils; low polycyclic aromatic (PCA) process oils such as TDAE and MES; plant oils; and mixtures thereof. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil.

The liquid diene polymers preferably have a polystyrene equivalent weight average molecular weight (Mw) of $1.0 \times 10^3$ to $2.0 \times 10^5$, more preferably $3.0 \times 10^3$ to $1.5 \times 10^4$ as measured by gel permeation chromatography (GPC).

Herein, the Mw of the liquid diene polymers refers to the polystyrene equivalent Mw measured by gel permeation chromatography (GPC).

Examples of the liquid diene polymers include liquid styrene-butadiene copolymers (liquid SBR), liquid polybutadiene polymers (liquid BR), liquid polyisoprene polymers (liquid IR), and liquid styrene-isoprene copolymers (liquid SIR).

Any liquid resin may be used, and examples include liquid aromatic vinyl polymers, coumarone-indene resins, indene resins, terpene resins, and rosin resins, and hydrogenated products of the foregoing.

Examples of the liquid aromatic vinyl polymers include resins produced by polymerizing α-methylstyrene and/or styrene. Specific examples include liquid resins such as styrene homopolymers, α-methylstyrene homopolymers, and copolymers of α-methylstyrene and styrene.

Liquid coumarone-indene resins refer to resins that contain coumarone and indene as main monomer components forming the skeleton (backbone) of the resins. Here, they include liquid resins in which monomer components such as styrene, α-methylstyrene, methylindene, and vinyltoluene may be contained in the skeleton in addition to coumarone and indene.

Liquid indene resins refer to liquid resins that contain indene as a main monomer component forming the skeleton (backbone) of the resins.

Liquid terpene resins refer to liquid terpene-based resins (e.g., terpene phenol resins, aromatic modified terpene resins) as typified by resins produced by polymerization of terpene compounds such as α-pinene, β-pinene, camphene, or dipentene, and terpenephenol resins produced from terpene compounds and phenolic compounds.

Liquid rosin resins refer to liquid rosin-based resins as typified by natural rosins, polymerized rosins, and modified rosins, and esterified products thereof and hydrogenated products thereof.

Commercial products such as "Art Pearl" produced by Negami Chemical Industrial Co., Ltd. and "Dynamic beads CM" produced by Dainichiseika Color & Chemicals Mfg. Co., Ltd. may be used as the urethane particles.

(Filler)

The tread (the vulcanized elastomer composition forming the tread) may further contain a filler (Reinforcing Filler).

Any filler may be used, and examples include carbon black, silica, calcium carbonate, talc, alumina, clay, aluminum hydroxide, aluminum oxide, and mica. From the standpoint of physical properties of the elastomer composition, silica or carbon black is preferred among these.

Examples of the silica include dry silica (anhydrous silica) and wet silica (hydrous silica). Wet silica is preferred among these because it contains a large number of silanol groups.

The silica content per 100 parts by mass of the elastomer components is preferably 5 parts by mass or more, more preferably 30 parts by mass or more, still more preferably 50 parts by mass or more, particularly preferably 60 parts by mass or more. The upper limit of the silica content is preferably 150 parts by mass or less, more preferably 120 parts by mass or less, still more preferably 100 parts by mass or less, particularly preferably 75 parts by mass or less. When the silica content is within the range indicated above, the increase in hardness and the decrease in wet grip performance due to aging tend to be reduced.

The nitrogen adsorption specific surface area ($N_2SA$) of the silica is preferably 80 $m^2/g$ or more, more preferably 120 $m^2/g$ or more, still more preferably 150 $m^2/g$ or more. The $N_2SA$ of the silica is also preferably 250 $m^2/g$ or less, more preferably 220 $m^2/g$ or less, still more preferably 200 $m^2/g$ or less. When the $N_2SA$ is within the range indicated above, the increase in hardness and the decrease in wet grip performance due to aging tend to be reduced.

The $N_2SA$ of the silica is measured by a BET method in accordance with ASTM D3037-93.

The silica may be commercially available from Degussa, Rhodia, Tosoh Silica Corporation, Solvay Japan, Tokuyama Corporation, etc.

The tread (the vulcanized elastomer composition forming the tread) which contains silica preferably further contains a silane coupling agent.

Any silane coupling agent may be used, and examples include: sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl) trisulfide, bis(4-trimethoxysilylbutyl)trisulfide, bis(3-triethoxysilylpropyl)disulfide, bis(2-triethoxysilylethyl) disulfide, bis(4-triethoxysilylbutyl)disulfide, bis(3-trimethoxysilylpropyl)disulfide, bis(2-trimethoxysilylethyl)

disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Usable commercial products are available from Degussa, Momentive, Shin-Etsu Silicone, Tokyo Chemical Industry Co., Ltd., AZmax. Co., Dow Corning Toray Co., Ltd., etc. These may be used alone or in combinations of two or more.

The silane coupling agent content per 100 parts by mass of the silica is preferably 3 parts by mass or more, more preferably 6 parts by mass or more. The silane coupling agent content is also preferably 12 parts by mass or less, more preferably 10 parts by mass or less.

Any carbon black may be used, and examples include GPF, FEF, HAF, ISAF, and SAF. Usable commercial products are available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc.

The carbon black (if present) content per 100 parts by mass of the elastomer components is preferably 1 part by mass or more, more preferably 3 parts by mass or more, still more preferably 5 parts by mass or more. The carbon black content is also preferably 50 parts by mass or less, more preferably 30 parts by mass or less, still more preferably 20 parts by mass or less. When the carbon black content is within the range indicated above, the increase in hardness and the decrease in wet grip performance due to aging tend to be reduced.

The nitrogen adsorption specific surface area ($N_2SA$) of the carbon black is preferably 40 $m^2$/g or more, more preferably 60 $m^2$/g or more, still more preferably 70 $m^2$/g or more, particularly preferably 90 $m^2$/g or more. The upper limit is preferably 200 $m^2$/g or less, more preferably 150 $m^2$/g or less, still more preferably 100 $m^2$/g or less. When the $N_2SA$ is within the range indicated above, the increase in hardness and the decrease in wet grip performance due to aging tend to be reduced.

The nitrogen adsorption specific surface area of the carbon black can be determined in accordance with JIS K 6217-2:2001.

(Liquid Plasticizer)

The tread (the vulcanized elastomer composition forming the tread) may contain a liquid plasticizer. Examples of the liquid plasticizer include those described above. Oils are preferred among these. These may be used alone or in combinations of two or more.

The liquid plasticizer content per 100 parts by mass of the elastomer components is preferably 5 parts by mass or more, more preferably 10 parts by mass or more, still more preferably 12 parts by mass or more, particularly preferably 20 parts by mass or more. The liquid plasticizer content is also preferably 70 parts by mass or less, more preferably 50 parts by mass or less, still more preferably 45 parts by mass or less, particularly preferably 35 parts by mass or less.

When the liquid plasticizer content is within the range indicated above, the increase in hardness and the decrease in wet grip performance due to aging tend to be reduced. The oil content is desirably in the same range.

The liquid plasticizer content includes the amount of the oils (extender oils) contained in the rubbers (oil extended rubbers), if used, but excludes the amount of the liquid plasticizer in the above-mentioned urethane particles encapsulating a liquid plasticizer.

The oils may be commercially available from Idemitsu Kosan Co., Ltd., Sankyo Yuka Kogyo K.K., Japan Energy Corporation, Olisoy, H&R, Hokoku Corporation, Showa Shell Sekiyu K.K., Fuji Kosan Co., Ltd., etc. The liquid diene polymers and liquid resins may be commercially available from CRAY VALLEY, Kuraray Co., Ltd., etc.

(Solid Resin)

The tread (the vulcanized elastomer composition forming the tread) may contain a solid resin (resin that is solid at room temperature (25° C.)).

The solid resin content per 100 parts by mass of the elastomer components is preferably 3 parts by mass or more, more preferably 5 parts by mass or more, still more preferably 10 parts by mass or more. The solid resin content is preferably 30 parts by mass or less, more preferably 20 parts by mass or less, still more preferably 15 parts by mass or less.

The softening point of the solid resin is preferably 20° C. or higher, more preferably 25° C. or higher, still more preferably 28° C. or higher, particularly preferably 30° C. or higher. The softening point is also preferably 200° C. or lower, more preferably 150° C. or lower. When the softening point is within the range indicated above, good properties such as abrasion resistance tend to be obtained.

The softening point of the resin is determined as set forth in JIS K 6220-1:2001 using a ring and ball softening point measuring apparatus and defined as the temperature at which the ball drops down.

Examples of the solid resin include solid styrene resins, coumarone-indene resins, terpene resins, p-t-butylphenol acetylene resins, acrylic resins, and petroleum resins such as dicyclopentadiene resins (DCPD resins), C5 petroleum resins, C9 petroleum resins, and C5/C9 petroleum resins. Usable commercial products are available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., Taoka Chemical Co., Ltd., Toagosei Co., Ltd., etc. These may be used alone or in combinations of two or more. Preferred among these is at least one solid resin selected from the group consisting of styrene resins and terpene resins.

Solid styrene resins refer to solid polymers produced from styrenic monomers as structural monomers, and examples include polymers polymerized from styrenic monomers as main components (at least 50% by mass). Specific examples include homopolymers polymerized from single styrenic monomers (e.g., styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene), copolymers copolymerized from two or more styrenic monomers, and copolymers of styrenic monomers and additional monomers copolymerizable therewith.

Examples of the additional monomers include acrylonitriles such as acrylonitrile and methacrylonitrile; unsaturated carboxylic acids such as acrylic and methacrylic acid;

unsaturated carboxylic acid esters such as methyl acrylate and methyl methacrylate; dienes such as chloroprene, butadiene, and isoprene; olefins such as 1-butene and 1-pentene; and α,β-unsaturated carboxylic acids and acid anhydrides thereof such as maleic anhydride.

Preferred among these are α-methylstyrene resins (e.g., α-methylstyrene homopolymers, copolymers of a-methylstyrene and styrene). Herein, the solid styrene resins conceptually do not include the above-mentioned styrene elastomers.

Solid coumarone-indene resins refer to resins that contain coumarone and indene as main monomer components forming the skeleton (backbone) of the resins. They include solid resins in which monomer components such as styrene, α-methylstyrene, methylindene, and vinyltoluene may be contained in the skeleton in addition to coumarone and indene.

Examples of the solid terpene resins include polyterpene, terpene phenol, and aromatic modified terpene resins.

Polyterpene resins refer to resins produced by polymerization of terpene compounds, or hydrogenated products of the resins. Terpene compounds refer to hydrocarbons having a composition represented by $(C_5H_8)_n$ or oxygen-containing derivatives thereof, each of which has a terpene backbone and is classified as, for example, a monoterpene $(C_{10}H_{16})$, sesquiterpene $(C_{15}H_{24})$, or diterpene $(C_{20}H_{32})$. Examples of the terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the solid polyterpene resins include solid terpene resins made from the above-mentioned terpene compounds, such as α-pinene resins, B-pinene resins, limonene resins, dipentene resins, and B-pinene-limonene resins, and solid hydrogenated terpene resins obtained by hydrogenation of the foregoing terpene resins. Examples of the solid terpene phenol resins include solid resins copolymerized from the above-mentioned terpene compounds and phenolic compounds, and solid resins obtained by hydrogenation of these resins. Specific examples include solid resins produced by condensation of the above-mentioned terpene compounds, phenolic compounds, and formaldehyde. Examples of the phenolic compounds include phenol, bisphenol A, cresol, and xylenol. Examples of the solid aromatic modified terpene resins (solid resins) include solid resins formed by modifying terpene resins with aromatic compounds, and solid resins obtained by hydrogenating these resins. The aromatic compounds may be any compound having an aromatic ring, including, for example: phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; styrene and styrene derivatives such as alkylstyrenes, alkoxystyrenes, and unsaturated hydrocarbon group-containing styrenes; coumarone and indene.

Examples of the solid p-t-butylphenol acetylene resins include solid resins produced by condensation of p-t-butylphenol and acetylene.

Although any solid acrylic resin may be used, solvent-free solid acrylic resins are suitable because they contain little impurities and provide a sharp molecular weight distribution.

Examples of the solvent-free acrylic resins include (meth) acrylic resins (polymers) synthesized by high temperature continuous polymerization (high temperature continuous bulk polymerization as described in, for example, U.S. Pat. No. 4,414,370, JP S59-6207 A, JP H5-58005 B, JP H1-313522 A, U.S. Pat. No. 5,010,166, and annual research report TREND 2000 issued by Toagosei Co., Ltd., vol. 3, pp. 42-45) using no or minimal amounts of auxiliary raw materials such as polymerization initiators, chain transfer agents, and organic solvents. Herein, the term "(meth) acrylic" means methacrylic and acrylic. Preferably, the acrylic resins are substantially free of auxiliary raw materials such as polymerization initiators, chain transfer agents, and organic solvents. Also preferred are acrylic resins having a relatively narrow compositional distribution or molecular weight distribution, produced by continuous polymerization.

Examples of the monomer components of the acrylic resins include (meth)acrylic acids and (meth)acrylic acid derivatives such as (meth)acrylic acid esters (e.g., alkyl esters, aryl esters, and aralkyl esters), (meth)acrylamides, and (meth)acrylamide derivatives. In addition to the (meth) acrylic acids or (meth)acrylic acid derivatives, aromatic vinyls, such as styrene, α-methylstyrene, vinyltoluene, vinylnaphthalene, divinylbenzene, trivinylbenzene, or divinylnaphthalene, may also be used as the monomer components of the acrylic resins.

The acrylic resins may be formed only of the (meth) acrylic components or may further contain constituent components other than the (meth)acrylic components. Moreover, the acrylic resins may contain a hydroxy group, a carboxyl group, a silanol group, or other substituents.

Solid petroleum resins refer to resins formed by polymerizing an oil fraction (e.g., C5 fraction or C9 fraction) obtained as a by-product of naphtha cracking used in the petrochemical industry. Examples include C5 petroleum resins produced by cationic polymerization of a C5 acyclic olefin mixture, dicyclopentadiene petroleum resins produced by thermal polymerization of a dicyclopentadiene fraction, C9 petroleum resins produced by cationic polymerization of a C9 aromatic olefin mixture, C5/C9 petroleum resins, and petroleum resins called as pure monomer resins produced from pure α-methylstyrene prepared from α-methylstyrene extracted from C9 fraction, as well as hydrogenated products of the foregoing resins. C5 petroleum resins, C9 petroleum resins, and C5/C9 petroleum resins are preferred among these, with C5 petroleum resins or C5/C9 petroleum resins being more preferred.

(Other Components)

The tread (the vulcanized elastomer composition forming the tread) may contain a wax. Any wax may be used, and examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Petroleum waxes are preferred among these, with paraffin waxes being more preferred.

The wax may be commercially available from Ouchi Shinko Chemical Industrial Co., Ltd., Nippon Seiro Co., Ltd., Seiko Chemical Co., Ltd., etc.

The wax (if present) content per 100 parts by mass of the elastomer components is preferably 0.3 parts by mass or more, more preferably 0.5 parts by mass or more, but is preferably 20 parts by mass or less, more preferably 10 parts by mass or less.

The tread (the vulcanized elastomer composition forming the tread) may contain an antioxidant. Examples of the antioxidant include naphthylamine antioxidants such as phenyl-α-naphthylamine; diphenylamine antioxidants such as octylated diphenylamine and 4,4'-bis(α,α'-dimethylbenzyl)

diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as polymerized 2,2,4-trimethyl-1,2-dihydroquinoline; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. Usable commercial products are available from Seiko Chemical Co., Ltd., Sumitomo Chemical Co., Ltd., Ouchi Shinko Chemical Industrial Co., Ltd., Flexsys, etc. These may be used alone or in combinations of two or more. Preferred among these are p-phenylenediamine or quinoline antioxidants.

The antioxidant (if present) content per 100 parts by mass of the elastomer components is preferably 0.5 parts by mass or more, more preferably 1 part by mass or more, but is preferably 10 parts by mass or less, more preferably 5 parts by mass or less.

The tread (the vulcanized elastomer composition forming the tread) may contain stearic acid. The stearic acid may be conventional ones, e.g., available from NOF Corporation, Kao Corporation, FUJIFILM Wako Pure Chemical Corporation, or Chiba Fatty Acid Co., Ltd.

The stearic acid (if present) content per 100 parts by mass of the elastomer components is preferably 0.5 parts by mass or more, more preferably 1 part by mass or more, but is preferably 10 parts by mass or less, more preferably 5 parts by mass or less.

The tread (the vulcanized elastomer composition forming the tread) may contain zinc oxide. The zinc oxide may be conventional ones, e.g., available from Mitsui Mining & Smelting Co., Ltd., Toho Zinc Co., Ltd., HakusuiTech Co., Ltd., Seido Chemical Industry Co., Ltd., or Sakai Chemical Industry Co., Ltd.

The zinc oxide (if present) content per 100 parts by mass of the elastomer components is preferably 0.5 parts by mass or more, more preferably 1 part by mass or more, but is preferably 10 parts by mass or less, more preferably 5 parts by mass or less.

The tread (the vulcanized elastomer composition forming the tread) preferably contains sulfur. Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be commercially available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc.

The sulfur (if present) content per 100 parts by mass of the elastomer components is preferably 0.1 parts by mass or more, more preferably 0.5 parts by mass or more, but is preferably 10.0 parts by mass or less, more preferably 5.0 parts by mass or less, still more preferably 3.0 parts by mass or less.

The tread (the vulcanized elastomer composition forming the tread) preferably contains a vulcanization accelerator. Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. Sulfenamide and/or guanidine vulcanization accelerators are preferred among these.

The vulcanization accelerator (if present) content per 100 parts by mass of the elastomer components is preferably 1.0 parts by mass or more, more preferably 2.0 parts by mass or more, but is preferably 10.0 parts by mass or less, more preferably 7.0 parts by mass or less.

In addition to the above-mentioned components, the tread (the vulcanized elastomer composition forming the tread) may further contain other compounding agents (e.g., organic crosslinking agents) commonly used in the tire industry. The amounts of such compounding agents are each preferably 0.1 to 200 parts by mass per 100 parts by mass of the elastomer components.

The elastomer composition as a whole preferably has a ratio of the styrene content (the total amount (g) of styrene in the elastomer composition) to the urethane particle content (the total amount (g) of urethane particles in the elastomer composition) (total styrene content/total urethane particle content) of 0.5 or higher, more preferably 0.7 or higher, still more preferably 0.9 or higher, particularly preferably 1.1 or higher, most preferably 1.2 or higher, even most preferably 1.7 or higher, further most preferably 1.8 or higher. The upper limit of the ratio is preferably 5.0 or lower, more preferably 4.5 or lower, still more preferably 4.0 or lower, particularly preferably 3.4 or lower, most preferably 3.6 or lower. When the ratio is within the range indicated above, the increase in hardness and the decrease in wet grip performance from before to after heat aging can be reduced.

The elastomer composition as a whole preferably has a ratio of the styrene content (the total amount (g) of styrene in the elastomer composition) to the silica content (the total amount (g) of silica in the elastomer composition) (total styrene content/total silica content) of 0.05 or higher, more preferably 0.10 or higher, still more preferably 0.15 or higher, particularly preferably 0.20 or higher, most preferably 0.22 or higher. The upper limit of the ratio is preferably 3.00 or lower, more preferably 2.00 or lower, still more preferably 1.00 or lower, particularly preferably 0.50 or lower, most preferably 0.30 or lower. When the ratio is within the range indicated above, the increase in hardness and the decrease in wet grip performance from before to after heat aging can be reduced.

The elastomer composition as a whole preferably has a ratio of the styrene content (the total amount (g) of styrene in the elastomer composition) to the solid resin content (the total amount (g) of solid resins in the elastomer composition) (total styrene content/total solid resin content) of 0.5 or higher, more preferably 1.0 or higher, still more preferably 1.5 or higher, particularly preferably 1.8 or higher. The upper limit of the ratio is preferably 3.5 or lower, more preferably 3.0 or lower, still more preferably 2.5 or lower, particularly preferably 2.2 or lower. When the ratio is within the range indicated above, the increase in hardness and the decrease in wet grip performance from before to after heat aging can be reduced.

The tread (the vulcanized elastomer composition forming the tread) may be prepared, for example, by kneading the above-mentioned components using a kneading machine such as an open roll mill or a Banbury mixer, and then vulcanizing the kneaded mixture.

The kneading conditions are as follows. In a base kneading step of kneading additives other than vulcanizing agents and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, preferably 85 to 110° C. Moreover, the composition obtained after kneading vulcanizing agents and vulcanization accelerators is usually vulcanized by, for example, press vulcanization. The vulcanization temperature is usually 140 to 190° C., preferably 150 to 185° C.

The tire of the present disclosure can be produced from the above-described elastomer composition by usual methods.

Specifically, the elastomer composition, before vulcanization, may be extruded into the shape of a tread and then formed together with other tire components on a tire building machine in a usual manner to build an unvulcanized tire. The unvulcanized tire may be heated and pressurized in a vulcanizer to produce a tire.

Examples of the tire include pneumatic tires and airless (solid) tires. Pneumatic tires are preferred among these. The tire may be used as a tire for passenger vehicles, large passenger vehicles, large SUVs, heavy duty vehicles such as trucks and buses, light trucks, or motorcycles, or as a racing tire (high performance tire) or other application tire. The tire may also be used as an all season tire, a summer tire, a studless winter tire (winter tire), or other type of tire. In particular, the tire is suitable for use as a summer passenger tire.

EXAMPLES

The present disclosure is specifically described with reference to, but not limited to, examples.

The chemicals used in the examples and comparative examples are listed below.

SBR 1: Production Example 1 described below
SBR 2: SBR: NS616 (non-oil extended SBR, styrene content: 21% by mass, vinyl content: 66 mol %, Mw: 240,000) available from Zeon Corporation
BR: BR730 (cis content: 95% by mass) available from JSR Corporation
Carbon black: N339 ($N_2SA$: 96 $m^2/g$) available from Mitsubishi Chemical Corporation
Silica: ULTRASIL VN3 ($N_2SA$: 175 $m^2/g$) available from Evonik
Silane coupling agent: Si266 (bis(3-triethoxysilylpropyl) disulfide) available from Evonik
Zinc oxide: Zinc oxide #1 available from Mitsui Mining & Smelting Co., Ltd.
Stearic acid: a product available from NOF Corporation
Antioxidant: NOCRAC 6C (N-(1,3-dimethylbutyl)-N'-phenyl-p-phenylenediamine) available from Ouchi Shinko Chemical Industrial Co., Ltd.
Aromatic oil: Process X-140 available from Japan Energy Corporation
Terpene resin: YS resin PX300N (softening point: 30° C., polyterpene resin (β-pinene resin)) available from Yasuhara Chemical Co., Ltd.
Styrene resin: Sylvatraxx 4401 (a copolymer of α-methylstyrene and styrene, softening point: 85° C., Tg: 43° C.) available from Arizona Chemical
Wax: Ozoace 0355 available from Nippon Seiro Co., Ltd.
Urethane particles 1: Art Pearl C-400 (urethane beads (hollow structure), average particle size: 15 μm) available from Negami Chemical Industrial Co., Ltd.
Urethane particles 2: Art Pearl C-800 (urethane beads (hollow structure), average particle size: 6 μm) available from Negami Chemical Industrial Co., Ltd.
Urethane particles 3: Art Pearl JB-400 (urethane beads (hollow structure), average particle size: 15 μm) available from Negami Chemical Industrial Co., Ltd.
Sulfur: powdered sulfur available from Karuizawa Sulfur Co., Ltd.
Vulcanization accelerator 1: Soxinol CZ (N-cyclohexyl-2-benzothiazolylsulfenamide) available from Sumitomo Chemical Co., Ltd.
Vulcanization accelerator 2: Soxinol D (N,N'-diphenylguanidine) available from Sumitomo Chemical Co., Ltd.

<Preparation of Chain End Modifier>

A 100 mL measuring flask was charged with 23.6 g of 3-(N,N-dimethylamino)propyltrimethoxysilane (3-dimethylaminopropyltrimethoxysilane, AZmax Co.) in a nitrogen atmosphere. Then, anhydrous hexane (Kanto Chemical Co., Inc.) was added to give a total volume of 100 mL.

Production Example 1

A sufficiently nitrogen-purged 30 L pressure-resistant vessel was charged with 18 L of n-hexane, 540 g of styrene (Kanto Chemical Co., Inc.), 1,460 g of butadiene, and 17 mmol of tetramethylethylenediamine, and the temperature was raised to 40° C. Next, 10.5 mL of butyllithium was added, and then the temperature was raised to 50° C., followed by stirring for three hours. Subsequently, 3.5 mL of a 0.4 mol/L solution of silicon tetrachloride in hexane was added, and the mixture was stirred for 30 minutes. Thereafter, 30 mL of the chain end modifier prepared above was added, and the mixture was stirred for 30 minutes. After 2 mL of methanol (Kanto Chemical Co., Inc.) containing 0.2 g of 2,6-tert-butyl-p-cresol (Ouchi Shinko Chemical Industrial Co., Ltd.) dissolved therein was added to the reaction solution, the reaction solution was put in a stainless steel vessel containing 18 L of methanol, and then aggregates were collected. The aggregates were dried under reduced pressure for 24 hours to obtain SBR 1. The SBR 1 had a styrene content of 28% by mass, an Mw of 717,000, and a vinyl content of 60 mol %.

Examples and Comparative Examples

According to each of the formulations shown in the tables, the materials other than the sulfur and vulcanization accelerators were kneaded for five minutes at 150° C. using a Banbury mixer (Kobe Steel, Ltd.) to give a kneaded mixture. Next, the sulfur and vulcanization accelerators were added to the kneaded mixture, and they were kneaded for five minutes at 80° C. using an open roll mill to obtain an unvulcanized rubber composition. The unvulcanized rubber composition was formed into the shape of a tread and assembled with other tire components on a tire building machine to build an unvulcanized tire. The unvulcanized tire was vulcanized at 170° C. for 15 minutes to prepare a test tire (new, size: 195/65R15).

The test tires were evaluated as described below. The tables show the results. It should be noted that heat aging was performed as described below. Comparative Examples 1-1, 2-1, 3-1, and 4-1 are used as standards of comparison in Tables 1, 2, 3, and 4, respectively.

(Heat Aging)

The test tires (new) were heat-aged at 80° C. for one week in accordance with JIS K 6257:2010 "Rubber, vulcanized or thermoplastic—Determination of heat ageing properties"

<Heat Resistance>
(Measurement of M100f Before Heat Aging and M100a after Heat Aging)

The test tires (new tires) were heat-aged in an oven at 80° C. for seven days (one week) to prepare heat-aged tires. A new sample (vulcanized elastomer composition) was taken from the tread of each new tire, and a heat-aged sample (vulcanized elastomer composition) was taken from the tread of each heat-aged tire. The M100 of the samples was determined by measuring the stress (MPa) at 100% elongation in a tensile test at 23° C. and 500 mm/min in accordance with JIS K 6251:2010 "Rubber, vulcanized or thermoplastics—Determination of tensile stress-strain properties".

(Hardness of Tread after Heat Aging)

The test tires (new tires) were heat-aged in an oven at 80° C. for seven days (one week) to prepare heat-aged tires. A heat-aged sample (vulcanized elastomer composition) was taken from the tread of each heat-aged tire. The hardness of the samples was measured according to the hardness measurement method stipulated in JIS K 6253. The hardness of each heat-aged sample is expressed as an index relative to the hardness of the heat-aged sample of the standard comparative example which is taken as 100. A lower index indicates a smaller increase in hardness due to heat aging and thus better heat resistance.

<Wet Grip Performance Test>

The breaking distance of a car with the heat-aged tires was measured at an initial speed of 100 km/h on a wet road. The breaking distance of each heat-aged tire is expressed as an index using the equation below where the breaking distance of the car with the heat-aged tires of the standard comparative example is taken as 100. A higher index indicates better wet grip performance after heat aging and thus better wet grip performance after long term driving.

(Wet grip performance index)=(Breaking distance of standard comparative example)/(Breaking distance of each formulation example)×100

TABLE 1

|  |  | Comparative Example | Example | | | | | | | | |
|---|---|---|---|---|---|---|---|---|---|---|---|
|  |  | 1-1 | 1-1 | 1-2 | 1-3 | 1-4 | 1-5 | 1-6 | 1-7 | 1-8 | 1-9 |
| Amount (parts by mass) | SBR 1 | 85 | 85 | 85 | 85 | 85 | 85 | 85 | 85 | 85 | 85 |
|  | BR | 15 | 15 | 15 | 15 | 15 | 15 | 15 | 15 | 15 | 15 |
|  | Carbon black | 5 | 5 | 5 | 5 | 5 | 5 | 5 | 5 | 5 | 5 |
|  | Silica | 60 | 60 | 60 | 60 | 60 | 60 | 60 | 60 | 60 | 60 |
|  | Silane coupling agent | 5 | 5 | 5 | 5 | 5 | 5 | 5 | 5 | 5 | 5 |
|  | Zinc oxide | 2 | 2 | 2 | 2 | 2 | 2 | 2 | 2 | 2 | 2 |
|  | Stearic acid | 2 | 2 | 2 | 2 | 2 | 2 | 2 | 2 | 2 | 2 |
|  | Antioxidant | 2.5 | 2.5 | 2.5 | 2.5 | 2.5 | 2.5 | 2.5 | 2.5 | 2.5 | 2.5 |
|  | Aromatic oil | 35 | 35 | 35 | 35 | 35 | 35 | 35 | 35 | 35 | 35 |
|  | Terpene resin | 10 | 10 | 10 | 10 | 10 | 10 | 10 | 10 | 10 | 10 |
|  | Wax | 2 | 2 | 2 | 2 | 2 | 2 | 2 | 2 | 2 | 2 |
|  | Urethane particles 1 |  | 5 | 10 | 15 |  |  |  |  |  |  |
|  | Urethane particles 2 |  |  |  |  | 5 | 10 | 15 |  |  |  |
|  | Urethane particles 3 |  |  |  |  |  |  |  | 5 | 10 | 15 |
|  | Sulfur | 1 | 1 | 1 | 1 | 1 | 1 | 1 | 1 | 1 | 1 |
|  | Vulcanization accelerator 1 | 2 | 2 | 2 | 2 | 2 | 2 | 2 | 2 | 2 | 2 |
|  | Vulcanization accelerator 2 | 2 | 2 | 2 | 2 | 2 | 2 | 2 | 2 | 2 | 2 |
| Evaluation results | M100f [MPa] before heat aging | 1.50 | 1.50 | 1.50 | 1.50 | 1.50 | 1.50 | 1.50 | 1.40 | 1.40 | 1.40 |
|  | M100a [MPa] after heat aging | 2.10 | 2.04 | 1.97 | 1.88 | 2.01 | 1.96 | 1.89 | 1.90 | 1.85 | 1.79 |
|  | M100a − M100f (Change in M100 [MPa] before and after heat aging) | 0.60 | 0.54 | 0.47 | 0.38 | 0.51 | 0.46 | 0.39 | 0.50 | 0.45 | 0.39 |
|  | $\Delta$M100 (Rate (%) of change in M100 before and after heat aging) | 40 | 36 | 31 | 25 | 34 | 31 | 26 | 36 | 32 | 28 |
|  | Total styrene content/Total urethane particle content |  | 3.6 | 1.8 | 1.2 | 3.6 | 1.8 | 1.2 | 3.6 | 1.8 | 1.2 |
|  | Total styrene content/Total silica content | 0.30 | 0.30 | 0.30 | 0.30 | 0.30 | 0.30 | 0.30 | 0.30 | 0.30 | 0.30 |
|  | Total styrene content/Total solid resin content | 1.8 | 1.8 | 1.8 | 1.8 | 1.8 | 1.8 | 1.8 | 1.8 | 1.8 | 1.8 |
|  | Tread hardness (index) after heat aging | 100 | 98 | 96 | 94 | 97 | 96 | 94 | 94 | 93 | 92 |
|  | Wet grip performance (index) after heat aging | 100 | 101 | 103 | 105 | 101 | 103 | 105 | 105 | 105 | 106 |

TABLE 2

|  |  | Comparative Example | Example | | |
|---|---|---|---|---|---|
|  |  | 2-1 | 2-1 | 2-2 | 2-3 |
| Amount (parts by mass) | SBR 1 | 80 | 80 | 80 | 80 |
|  | BR | 20 | 20 | 20 | 20 |
|  | Silica | 75 | 75 | 75 | 75 |
|  | Silane coupling agent | 6 | 6 | 6 | 6 |
|  | Zinc oxide | 2 | 2 | 2 | 2 |

TABLE 2-continued

|  |  | Comparative Example | Example | | |
|---|---|---|---|---|---|
|  |  | 2-1 | 2-1 | 2-2 | 2-3 |
|  | Stearic acid | 2 | 2 | 2 | 2 |
|  | Antioxidant | 2.5 | 2.5 | 2.5 | 2.5 |
|  | Aromatic oil | 20 | 20 | 20 | 20 |
|  | Wax | 2 | 2 | 2 | 2 |
|  | Urethane particles 1 |  | 5 | 10 | 15 |
|  | Urethane particles 2 |  |  |  |  |
|  | Urethane particles 3 |  |  |  |  |
|  | Sulfur | 1.5 | 1.5 | 1.5 | 1.5 |
|  | Vulcanization accelerator 1 | 2 | 2 | 2 | 2 |
|  | Vulcanization accelerator 2 | 2 | 2 | 2 | 2 |
| Evaluation results | M100f [MPa] before heat aging | 2.90 | 2.80 | 2.80 | 2.80 |
|  | M100a [MPa] after heat aging | 4.10 | 3.20 | 3.10 | 3.00 |
|  | M100a − M100f (Change in M100 [MPa] before and after heat aging) | 1.20 | 0.40 | 0.30 | 0.20 |
|  | $\Delta$M100 (Rate (%) of change in M100 before and after heat aging) | 41 | 14 | 11 | 7 |
|  | Total styrene content/Total urethane particle content |  | 3.4 | 1.7 | 1.1 |
|  | Total styrene content/Total silica content | 0.22 | 0.22 | 0.22 | 0.22 |
|  | Tread hardness (index) after heat aging | 100 | 87 | 86 | 84 |
|  | Wet grip performance (index) after heat aging | 100 | 106 | 107 | 108 |

TABLE 3

|  |  | Comparative Example | Example | | |
|---|---|---|---|---|---|
|  |  | 3-1 | 3-1 | 3-2 | 3-3 |
| Amount (parts by mass) | SBR 2 | 85 | 85 | 85 | 85 |
|  | BR | 15 | 15 | 15 | 15 |
|  | Carbon black | 5 | 5 | 5 | 5 |
|  | Silica | 60 | 60 | 60 | 60 |
|  | Silane coupling agent | 5 | 5 | 5 | 5 |
|  | Zinc oxide | 2 | 2 | 2 | 2 |
|  | Stearic acid | 2 | 2 | 2 | 2 |
|  | Antioxidant | 2.5 | 2.5 | 2.5 | 2.5 |
|  | Aromatic oil | 35 | 35 | 35 | 35 |
|  | Terpene resin | 10 | 10 | 10 | 10 |
|  | Wax | 2 | 2 | 2 | 2 |
|  | Urethane particles 1 |  | 5 | 10 | 15 |
|  | Urethane particles 2 |  |  |  |  |
|  | Urethane particles 3 |  |  |  |  |
|  | Sulfur | 1 | 1 | 1 | 1 |
|  | Vulcanization accelerator 1 | 2 | 2 | 2 | 2 |
|  | Vulcanization accelerator 2 | 2 | 2 | 2 | 2 |
| Evaluation results | M100f [MPa] before heat aging | 2.90 | 2.90 | 2.90 | 2.90 |
|  | M100a [MPa] after heat aging | 4.05 | 3.50 | 3.40 | 3.30 |
|  | M100a − M100f (Change in M100 [MPa] before and after heat aging) | 1.15 | 0.60 | 0.50 | 0.40 |
|  | $\Delta$M100 (Rate (%) of change in M100 before and after heat aging) | 40 | 21 | 17 | 14 |
|  | Total styrene content/Total urethane particle content |  | 3.6 | 1.8 | 1.2 |
|  | Total styrene content/Total silica content | 0.30 | 0.30 | 0.30 | 0.30 |
|  | Total styrene content/Total solid resin content | 1.8 | 1.8 | 1.8 | 1.8 |
|  | Tread hardness (index) after heat aging | 100 | 90 | 88 | 86 |
|  | Wet grip performance (index) after heat aging | 100 | 102 | 103 | 106 |

TABLE 4

|  |  | Comparative Example 4-1 | Example 4-1 |
|---|---|---|---|
| Amount (parts by mass) | SBR 2 | 85 | 85 |
|  | BR | 15 | 15 |
|  | Carbon black | 5 | 5 |

TABLE 4-continued

|  |  | Comparative Example 4-1 | Example 4-1 |
|---|---|---|---|
|  | Silica | 60 | 60 |
|  | Silane coupling agent | 5 | 5 |
|  | Zinc oxide | 2 | 2 |
|  | Stearic acid | 2 | 2 |
|  | Antioxidant | 2.5 | 2.5 |
|  | Aromatic oil | 35 | 35 |
|  | Styrene resin | 10 | 10 |
|  | Wax | 2 | 2 |
|  | Urethane particles 1 |  | 10 |
|  | Urethane particles 2 |  |  |
|  | Urethane particles 3 |  |  |
|  | Sulfur | 1 | 1 |
|  | Vulcanization accelerator 1 | 2 | 2 |
|  | Vulcanization accelerator 2 | 2 | 2 |
| Evaluation results | M100f [MPa] before heat aging | 1.40 | 1.40 |
|  | M100a [MPa] after heat aging | 2.00 | 1.93 |
|  | M100a − M100f (Change in M100 [MPa] before and after heat aging) | 0.60 | 0.53 |
|  | ⊿M100 (Rate (%) of change in M100 before and after heat aging) | 43 | 38 |
|  | Total styrene content/Total urethane particle content |  | 1.8 |
|  | Total styrene content/Total silica content | 0.30 | 0.30 |
|  | Total styrene content/Total solid resin content | 1.8 | 1.8 |
|  | Tread hardness (index) after heat aging | 100 | 97 |
|  | Wet grip performance (index) after heat aging | 100 | 102 |

As shown in the tables, less increase in tread hardness from before to after heat aging and good wet grip performance after heat aging were exhibited in the tire examples including a tread which included an elastomer composition containing a styrene elastomer and urethane particles and which satisfied relationship (1). Thus, it was demonstrated that the tires can maintain good tire physical properties such as wet grip performance after long term driving.

The invention claimed is:

1. A tire, comprising a tread,
the tread comprising an elastomer composition comprising a styrene elastomer and urethane particles,
the tread satisfying the following relationship (1):

$$(M100a-M100f)/M100f \times 100 \leq 38 \quad (1)$$

wherein M100f represents stress at 100% elongation (23° C.) before heat aging, and M100a represents stress at 100% elongation (23° C.) after heat aging, and
M100a is 1.79 MPa or higher and 3.50 MPa or lower.

2. The tire according to claim 1, wherein the urethane particles have an average particle size of 500 μm or less.

3. The tire according to claim 1, wherein the styrene elastomer is a styrene-butadiene rubber.

4. The tire according to claim 1, wherein the elastomer composition as a whole has a ratio of a styrene content to an urethane particle content (total styrene content/total urethane particle content) of 0.5 to 5.0.

5. The tire according to claim 1, wherein the elastomer composition as a whole has a ratio of a styrene content to a silica content (total styrene content/total silica content) of 0.05 to 3.00.

6. The tire according to claim 1, wherein the elastomer composition as a whole has a ratio of a styrene content to a solid resin content (total styrene content/total solid resin content) of 0.5 to 3.5.

7. The tire according to claim 1, wherein the elastomer composition comprises at least one solid resin selected from the group consisting of styrene resins and terpene resins.

8. The tire according to claim 3, wherein the elastomer composition has a styrene-butadiene rubber content of 50 to 95% by mass and a polybutadiene rubber content of 5 to 50% by mass, each based on 100% by mass of elastomer components in the elastomer composition.

9. The tire according to claim 3, wherein the styrene-butadiene rubber has a styrene content of 5 to 50% by mass, a vinyl content of 10 to 80 mol %, and a weight average molecular weight of 200,000 to 1,500,000.

10. The tire according to claim 3, wherein the styrene-butadiene rubber is a modified styrene-butadiene rubber.

11. The tire according to claim 1, wherein the elastomer composition has an urethane particle content of 1 to 50 parts by mass per 100 parts by mass of elastomer components in the elastomer composition.

12. The tire according to claim 1, wherein the elastomer composition comprises at least one selected from the group consisting of silica and carbon black.

13. The tire according to claim 12, wherein the silica has a nitrogen adsorption specific surface area of 80 to 250 m$^2$/g, and the carbon black has a nitrogen adsorption specific surface area of 40 to 200 m$^2$/g.

14. The tire according to claim 1, wherein the elastomer composition comprises at least one selected from the group consisting of liquid plasticizers and solid resins.

15. The tire according to claim 1, satisfying the following relationship (1f):

$$0.50\ \text{MPa} \leq M100f \leq 7.00\ \text{MPa} \quad (1f)$$

wherein M100f represents stress at 100% elongation (23° C.) before heat aging.

16. The tire according to claim 1, which is a summer passenger tire.

17. A tire, comprising a tread,
the tread comprising an elastomer composition comprising a styrene elastomer and urethane particles,
the tread satisfying the following relationship (1):

$$(M100a-M100f)/M100f \times 100 \leq 38 \quad (1)$$

wherein M100f represents stress at 100% elongation (23° C.) before heat aging, and M100a represents stress at 100% elongation (23° C.) after heat aging;

wherein heat aging is conducted in accordance with JIS K 6257:2010 "Rubber, vulcanized or thermoplastic-Determination of heat ageing properties" under heat aging conditions at 80° C. for 168 hours.

* * * * *